United States Patent Office 2,981,698
Patented Apr. 25, 1961

2,981,698

DYNAMOELECTRIC BRUSH

Henry B. Arnold, St. Marys, Pa., assignor to Stackpole Carbon Company, St. Marys, Pa., a corporation of Maryland No Drawing. Filed Mar. 15, 1956, Ser. No. 571,847

3 Claims. (Cl. 252—506)

This invention relates to carbon brushes used in dynamoelectric machines, and more particularly to such brushes intended for aircraft use.

Patent No. 1,121,960 describes a carbon brush consisting of a mixture of finely divided carbon and metal sulfide bound together by a carbon bond. It has been found that brushes made in accordance with that patent have characteristics that are very desirable for use in aircraft type dynamoelectric machines, but they also have a serious shortcoming, which is that they cannot withstand the high temperatures to which they often are subjected in use. Thus, in many cases, aircraft dynamoelectric machines requires brushes, at least the contact face portions of the brushes, to operate at temperatures as high as 350° C. When brushes made of a mixture of finely divided carbon and finely divided sulfide of a metal of the chromium group, all bound together by a carbon bond are used at such temperatures, their faces wear away very rapidly. In tests made on the brushes in air, it has been found that when they are held at 350° C. for sixteen hours, they will completely disintegrate.

It is therefore among the objects of this invention to provide a brush containing a metal sulfide addition, which will not wear appreciably over a long period of time when used at high temperatures, such as in aircraft dynamoelectric machines.

According to this invention, a metal sulfide of the chromium group, such as molybdenum sulfide or tungsten sulfide, is preferably reduced to finely divided particles that will pass through a 200 mesh screen. This material is then mixed with a resin and a solvent for the resin, after which the solvent is allowed to evaporate so that masses or balls of the sulfide particles will be produced. These will generally be between a quarter and a half inch in diameter. These balls are then broken up in any suitable manner to a size that will pass through a screen of at least 4 mesh and preferably about 20 mesh, but be stopped by a screen of about 35 mesh. In another operation carbon powder is mixed with a resin and a solvent, the mixture is allowed to dry and then it is pulverized so that the material will pass through about a 150 mesh screen. Suitable resins for this purpose are, for example, phenolformaldehyde and melamine resins. It will be seen that the metal sulfide agglomerates may be from about 4 to 35 times larger than the carbon particles. The small agglomerates of metal sulfide particles are then blended with the carbon particles, and the mixture is molded under pressure into the form of brushes and fired around 600° C. to carbonize the resin and thus form a carbon bond. The metal sulfide should form from about 2% to about 20% by weight of the brush, but about 10% is preferred.

The resulting brush is predominantly carbon, but interspersed throughout the brush are agglomerates of metal sulfide. In other words, the metal sulfide is not in the form of finely divided particles uniformly distributed among carbon particles of about the same size, but is concentrated in spaced spots so that the face of the brush has a freckled appearance. It has been found that such a brush can be operated continuously in air at 350° C. for sixteen hours without losing more than about one percent of its original weight, as compared with complete disintegration that occurs when the metal sulfide is not agglomerated. Apparently, the reason for this new unexpected performance of my brush is that in the old brushes the metal sulfide catalyzed the oxidation of the carbon bond at 350° C., which resulted in the brush crumbling away; while in my brush the catalytic effect of the sulfide is confined to the relatively widely spaced areas occupied by the agglomerates. The result is that the carbon bond, as a whole, is unaffected and the brush therefore retains its strength and wearing quality. Although the agglomerates may break up, the sulfide particles will be held in the brush by the surrounding carbon body.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A dynamoelectric brush capable of sustained operation at 350° C., consisting essentially of carbon particles bonded together by a carbon bond, and metal sulfide agglomerates dispersed among the carbon particles, said sufide being of a metal of the chromium group, said agglomerates being a size that will pass through a screen of about 4 mesh and be stopped by a screen of about 35 mesh, the metal sulfide forming between 2% and 20% of the weight of the brush and the bonded carbon forming substantially all of the remainder of the brush.

2. A dynamoelectric brush capable of sustained operation at 350° C., consisting essentially of carbon particles bonded together by a carbon bond, and metal sulfide agglomerates dispersed among the carbon particles, said sulfide being of a metal of the chromium group, said carbon particles being a size that will preponderately pass a 150 mesh screen, and said agglomerates being a size that will pass through a screen of about 20 mesh and be stopped by a screen of about 35 mesh, the metal sulfide forming between 2% and 20% of the weight of the brush and the bonded carbon forming substantially all of the remainder of the brush.

3. A dynamoelectric brush capable of sustained operation at 350° C., consisting essentially of carbon particles bonded together by a carbon bond, and metal sulfide agglomerates dispersed among the carbon particles, said sulfide being of a metal of the chromium group, said carbon particles being a size that will pass through about a 150 mesh screen, and said agglomerates being from about 4 to 35 times larger than the carbon particles, the metal sulfide forming between 2% and 20% of the weight of the brush and the bonded carbon forming substantially all of the remainder of the brush.

References Cited in the file of this patent

UNITED STATES PATENTS 1,121,960   Whitney _____ Dec. 22, 1914